United States Patent
Inami et al.

[11] Patent Number: 5,244,844
[45] Date of Patent: Sep. 14, 1993

[54] METHOD OF MANUFACTURING GRADIENT INDEX OPTICAL ELEMENTS

[75] Inventors: Minoru Inami, Hachijoi; Masayuki Yamane, Yokohama, both of Japan

[73] Assignee: Olympus Optical Company Limited, Japan

[21] Appl. No.: 838,102

[22] Filed: Feb. 18, 1992

[30] Foreign Application Priority Data

Feb. 15, 1991 [JP] Japan .................................. 3-042799

[51] Int. Cl.$^5$ .............................................. C03C 4/00
[52] U.S. Cl. .................................... 501/12; 501/53; 65/30.13; 65/18.1
[58] Field of Search ................... 501/12, 53; 65/30.13, 65/18.1

[56] References Cited

U.S. PATENT DOCUMENTS

| | | | |
|---|---|---|---|
| 4,686,195 | 8/1987 | Yamane | 501/12 |
| 4,797,376 | 1/1989 | Caldwell et al. | 501/12 |
| 4,902,650 | 2/1990 | Caldwell et al. | 501/12 |
| 5,068,208 | 11/1991 | Haun et al. | 501/12 |
| 5,069,700 | 12/1991 | Yamane et al. | 501/12 X |

*Primary Examiner*—Karl Group
*Attorney, Agent, or Firm*—Bruce L. Adams; Van C. Wilks

[57] ABSTRACT

A method of manufacturing a gradient index optical element comprises preparing a sol using silicon alkoxide and an aqueous metal salt solution as a source of index-modifying cations. The sol is treated to obtain a wet gel. Metal salt from the wet gel is eluted by immersing the wet gel in a solvent to produce a concentration gradiation of the metal salt in the wet gel. The metal salt is fixed in the wet gel by immersing the wet gel in a solvent. The steps of eluting and fixing are repeated so that a gradient index optical element is produced having a large difference in refractive index between the outer periphery portion and the center of the gel.

10 Claims, 1 Drawing Sheet

METHOD OF MANUFACTURING GRADIENT INDEX OPTICAL ELEMENTS

BACKGROUND OF THE INVENTION

The present invention relates to a method of manufacturing gradient or distributed index optical elements with the use of a sol-gel process applied to the manufacture of optical elements such as an optical lens.

Conventionally a method of manufacturing gradient index optical elements having gradient index in the diametrical direction, has been carried out using a sol-gel process.

For imparting concentration distribution in the sol-gel process, the methods described in, for example, articles in Journal of Non-Crystalline Solids, 85 (1986)., pp. 244-246 and 100 (1988)., pp. 511-513 as well as U.S. Pat. No. 4,686,195 are well known. In these methods, a sol is prepared by adding an aqueous metal salt solution, that is, an aqueous $(CH_3CO_2)_2PbO$ solution, as a source of index-modifying Pb cations to make a high refractive index after subjecting the silica sol to a gelling treatment to form a wet gel, this wet silica gel is dipped in a solution capable of dissolving and diffusing the above metal salt, and then the silica gel is dried and sintered.

In the gradient or distributed index optical elements formed in the above conventional manufacturing method, the step of producing a gradient index is performed only one time. In this case, the refractive index at the outer periphery portion is decreased to some extent, but the concentration of the metal salt contributing to the formation of the refractive index distribution is not sufficiently decreased, so that a large value of difference ($\Delta n$) between the refractive index of the center portion and that of the outer periphery portion of the optical elements can not be obtained.

Since an eluting solution producing gradient index distribution to the metal salt in the wet gel does not include metal constituents (ions) present in the gel, it is considered that if the gel is immersed in the eluting solution, as shown in FIG. 2 by a dot-dash line 1, the concentration of the salt at the outer periphery portion of the optical elements becomes zero, theoretically. However, as shown in FIG. 2 by solid line 2, actually, the metal salt concentration does not become zero, and the refractive index at the outer periphery portion exhibits a high value, so that large refractive difference $\Delta n$ can not be obtained to the extent to be expected from the theoretical value.

SUMMARY OF THE INVENTION

It is an object of the present invention to overcome the above described disadvantages of the conventional method for manufacturing gradient index optical elements.

It is another object of the present invention to provide gradient index optical elements having a larger difference in refractive index $\Delta n$ compared with conventional one.

It is a further object of the present invention to provide gradient index optical elements in which a difference in refractive index between the center portion and the outer periphery portion of the optical elements can be made large.

To this end, according to the present invention, there is provided a method of manufacturing gradient index optical elements utilizing a sol-gel process comprising a process for repeating steps of fixing and eluting the metal salt from a wet gel obtained from a sol including silicon alkoxide and a metal salt for raising a refractive index plural times.

According to the present invention, there is provided a method of manufacturing gradient index optical elements comprising: a first step of preparing a sol by adding a metal salt including metal constituents for raising a refractive index into a silicon alkoxide, and after subjecting the sol to a gelling treatment to obtain a wet gel, fixing the metal salt in the gel; a second step of immersing the wet gel in a solution capable of eluting and diffusing the metal salt thereby imparting concentration distribution of the metal salt in the gel, thereafter fixing the concentration distribution of the metal salt, the second step being repeated plural times; and a third step of drying and sintering the wet gel.

In the second step of the first time, the wet gel is immersed in the solution for a time longer than that of the second step of second time.

In the second step of the first time, the wet gel is immersed in the solution during the time required for the solution to be reached to the center portion of the gel, that is, the time equal to or longer than that of the second step of second time.

In the second step of the second time and, the wet gel is immersed in the solution for a time shorter than that required for the solution to reach the center portion of the gel.

It is found that if the refractive index producing a step consisting of eluting and fixing the metal salt is repeated plural times, the gradient index optical elements having large difference in refractive index $\Delta n$ can be obtained. That is, after the step of imparting concentration distribution of the metal salt and the step of fixing the concentration distribution are carried out as in the past, the process does not proceed to the step of drying the wet gel at once, and the above metal salt concentration distribution imparting step and the concentration distribution fixing step are again performed. In this case, the concentration of the metal salt at the outer periphery portion of the gel is made lower than the center portion of the gel under the conditions that the concentration of the metal salt at the center portion of the gel are held as it is.

The step of imparting producing a concentration distribution consists of three processes, that is, a diffusion process of producing a gradient immersing solution in the gel, a dissolution process of index of metal constituent and a process of eluting the dissolved constituent to the outside of the gel.

According to the manufacturing method of the present invention, the refractive index at the outer periphery portion of the gel can be decreased while holding the refractive index at the center portion of the gel as it is, so that the gradient index optical elements having a large difference in refractive index ($\Delta n$) can be formed as compared with conventional methods.

DETAILED EXPLANATION OF THE PREFERRED EMBODIMENT

Figure 2:
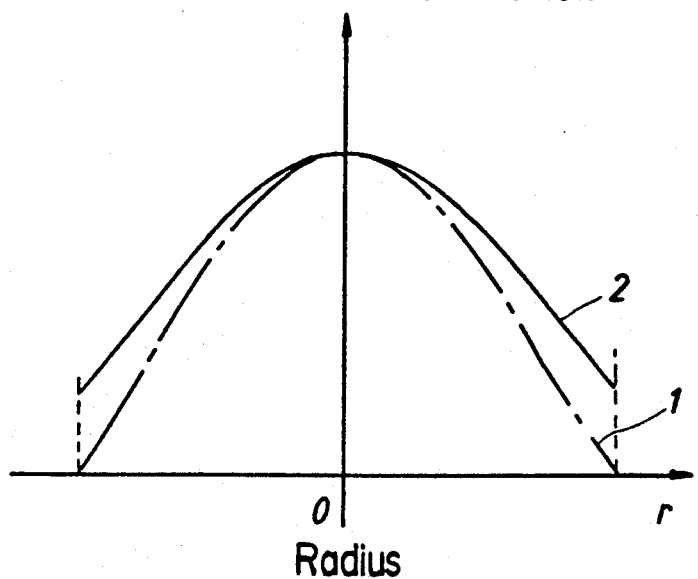
FIG. 2 is a graph showing the concentration distribution of the metal salt in the wet gel.

In a method of manufacturing gradient index optical elements of the present invention, as shown in FIG. 2 by a solid line 2, the gradient index imparting time of the first concentration gradient index producing step is determined by a suitable time in such a manner that the concentration distribution of the gradient index of metal constituent after the fixing step of the metal salt becomes a convex shape, that is, the immersing solution reaches the center portion of the gel, the gradient index of the metal constituent is dissolved and the dissolved constituent is able to diffuse outside of the gel.

Then, the time for the gradient index of the second concentration distribution step due to the immersion process is determined by approximately calculating from the diffusion speed the time for the immersing solution and reach the center portion of the gel. According to the second immersion step, the concentration of the metal salt for producing a gradient index is decreased only the outer periphery portion of the gel and thus the refractive index at the outer periphery portion becomes further decreased, so that a larger difference in refractive index Δn compared to the conventional methods can be realized.

When the concentration distribution process is carried out of many times, instead of the concentration distribution process being carried out two times, a larger difference in refractive index Δn can be realized and thus the concentration distributing shape can be controlled precisely.

EXAMPLE 1

25.0 ml of hydrochloric acid (pH 2) was added in a mixed solution consisting of 30.0 ml of silicon tetramethoxide (0.203 mol), 30.0 ml of silicon tetraethoxide (0.134 mol) and 12.4 ml of triethyl borate (0.0729 mol) and then stirred. After cooling the thus obtained solution to room temperature, a mixed solution consisting of 107.6 ml of lead acetate aqueous solution (1.25 mol/l) and 15.4 ml of acetate acid was added in the solution and stirred and thus a sol prepared.

The obtained sol was poured in a polypropylene container having an inner diameter of 35 mm with a depth of 50 mm and it was left to stand and thereafter a wet gel was obtained.

The thus obtained wet gel was aged for five days and it was dipped in a mixed solution of 0.61 mol/l of lead acetate water-isopropanol (water:isopropanol=2:8 vol ratio) for three days at 60° C. The obtained wet gel was respectively dipped in two kinds of solutions of isopropanol:acetone=8:2 and 5:5 (vol ratio) every two days in order at 30° C. Then the wet gel was further dipped in acetone for two days. The obtained wet gel was dipped in an ethanol solution (0.61 mol/l) of potassium acetate for eight hours at 30° C., thereby performing the process of forming a gradient concentration distribution of lead constituent . potassium constituent.

Then, the wet gel obtained after performing the first concentration distribution process was respectively dipped in order in a solution of isopropanol:acetone=5:5 (vol ratio) and acetone for every two days at 30° C.

There after, this wet gel was dipped in an ethanol solution (0.61 mol/l) of potassium acetate for one hour, thereby producing a second gradient concentration distribution of lead constituent . potassium constituent.

Then, the obtained wet gel was dipped in acetone for two days at 30° C. and it was moved on a polypropylene platform placed in a glass container in which acetone is provided on the bottom thereof, and the glass container was tightly closed with aluminum foil, and thus it was dried for five days at 30° C.

The dried and obtained dry gel having a diameter of about 20 mm and a height of 30 mm was inserted in a tubular furnace and heated and cooled with following temperature conditions. At first, the dry gel was heated with a temperature arising rate of 20° C./hour from room temperature to 460° C., and it was respectively held for 12 hours at 240° C. and 460° C. Then, the dry gel was heated to 560° C. with a temperature arising rate of 15° C./hour and it was respectively held for 12 hours at 510° C. and 560° C., and then it was cooled to room temperature with a temperature falling rate of 100° C./hour. In this case, oxygen gas flowed in the tubular furnace with a flow rate of 50 l/min until 460° C. and then helium gas flowed in the tubular furnace instead of the oxygen gas until the commencement of the temperature falling step. In this way, a transparent and foamless glass body having a diameter of 13.0 mm and a length of 19 mm was obtained.

Figure 1:
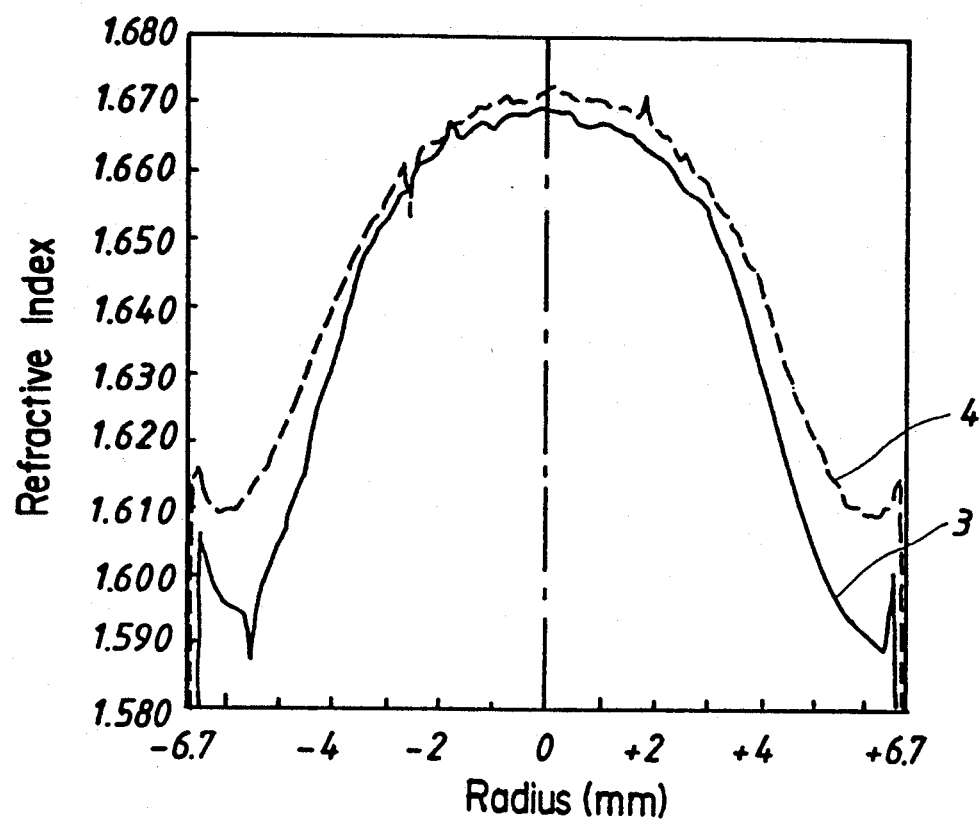
FIG. 1 is a graph showing refractive index distribution of glass body obtained by an example 1 of the present invention and a comparative example thereof.

The gradient index in the radial direction of the thus obtained cylindrical glass body was measured at the cross-section of its center portion in the longitudinal direction and the measured results are shown in FIG. 1 by a solid line 3 and as follows. That is, the glass body has a refraction index nd=1.670 at its center portion, a refractive index nd=1.588 at its periphery portion and a difference in refractive index (Δn)=0.082.

Comparative Example

The wet gel formed in the same manner as in Example 1 is subjected to only a second step forming a concentration gradient distribution at a first time for eight hours, and dried and calcined to form a glass body. The gradient index in the radial direction of the thus obtained glass body was measured at the cross-section of its center portion in the longitudinal direction and the measured results are shown in FIG. 1 by a broken line 4 and as follows. That is, the thus obtained glass body has refractive index nd=1.670 at its center portion, refractive index nd=1.608 at its periphery portion and the difference in refraction index (Δn)=0.062.

EXAMPLE 2

A wet gel formed in the same manner as in Example 1 is subjected to a second step forming concentration gradient distribution step a first time for eight hours and then to two second step forming concentration gradient distributions having time durations of 15 minutes and for 30 minutes, respectively, to obtain two glass bodies. The gradient index in the radial direction of the thus obtained glass body was measured at the cross-section of its center portion in the longitudinal direction and the measured results in the same manner as the above and the value of the difference in refractive index Δn was obtained as shown in a following Table 1.

TABLE 1

| | Concentration distribution imparting time | | Difference in refractive index (Δn) |
|---|---|---|---|
| | First time | Second time | |
| Example 1 | 8 hours | 1 hour | 0.082 |
| Example 2 | 8 hours | 15 minutes | 0.068 |
| | 8 hours | 30 minutes | 0.075 |

TABLE 1-continued

| | Concentration distribution imparting time | | Difference in refractive index ($\Delta n$) |
|---|---|---|---|
| | First time | Second time | |
| Comparative Example | 8 hours | | 0.062 |

It is found from the measured results of Example 1, Example 2 and the Comparative Example that by performing second concentration gradient distribution a second step forming a time, the degree of the decreasing of the lead constituent at the outer periphery of the gel is dependent on a length of the immersing time, and the difference in refractive index $\Delta n$ can be controlled by the immersing time of the second step of forming a concentration gradient distribution of the second time.

EXAMPLE 3

The wet gel formed in the same manner as in Example 1 was subjected to a second step of forming a concentration distribution for a first time for eight hours and then to second step of forming concentration gradient distribution a second time for one hour, thereby obtaining a wet gel. Thus obtained wet gel was subjected to a second step of forming a concentration gradient distribution a third time for 30 minutes and after this third time, to a second step for forming a concentration gradient distribution a fourth time for 15 minutes thereafter wet gels were respectively dried and calcined, thereby obtaining a transparent glass body.

The gradient index in the radial direction of the thus obtained glass body was measured at the cross-section of its center portion in the longitudinal direction in the same manner as the above and the measured results are shown in a following Table 2 together with the difference in refractive index ($\Delta n$) of Example 1 and Comparative Example. It is found that by performing the second step of forming a concentration gradient distribution plural times, lead constituent of the outer periphery portion of the gel becomes decreased gradually by eluting the lead constituent every repeated time of the second step of forming a concentration gradient distribution, so that the difference in refractive index $\Delta n$ can be controlled.

TABLE 2

| | Concentration distribution imparting time | | | | Difference in refractive index $\Delta n$ |
|---|---|---|---|---|---|
| | First time | Second time | Third time | Fourth time | |
| Example 1 | 8 hours | 1 hour | | | 0.082 |
| Example 3 | 8 hours | 1 hour | 30 minutes | | 0.090 |
| | 8 hours | 1 hour | 30 minutes | 15 minutes | 0.095 |
| Comparative Example | 8 hours | | | | 0.062 |

What is claimed is:

1. A method of manufacturing gradient index optical elements utilizing a sol-gel process, comprising the steps of:

(a) preparing a sol using silicon alkoxide and an aqueous metal salt solution as a source of refractive index-modifying cations, subjecting said sol to a gelling treatment to obtain a wet gel, and immersing said gel in a solvent to fix said metal salt in said gel; and (b) immersing said wet gel in a solvent to dissolve said metal salt and elute said metal salt outside said gel thereby producing a concentration gradient of said metal salt in said gel, and thereafter immersing said gel in a solvent to fix said metal salt in said gel.

2. A method according to claim 1; wherein step (b) is repeated a plurality of times, and the time duration the first time the wet gel is immersed in the solvent to dissolve said metal salt is longer than the time duration of a subsequent time the wet gel is immersed to dissolve said metal salt.

3. A method according to claim 2; wherein the time duration of the first time the wet gel is immersed in the solvent to dissolve the metal salt is long enough for the solvent to reach a center portion of the wet gel.

4. A method according to claim 3; wherein the time duration of each subsequent time the wet gel is immersed in the solvent to dissolve the metal salt is not long enough for the solvent to reach the center portion of the wet gel.

5. A method according to claim 1; further comprising (c) drying and sintering the wet gel.

6. A method of manufacturing a gradient index optical element, comprising the step of: preparing a sol by using silicon alkoxide and at least one aqueous metal salt solution as a source of refractive index-modifying cations; treating the sol to a gelling treatment to obtain a wet gel; eluting some of the metal salt from the wet gel by immersing the wet gel in a solvent to produce a concentration gradient of the metal salt in the wet gel; and then fixing the metal salt in the wet gel by immersing the wet gel in a solvent.

7. A method of manufacturing a gradient index optical element according to claim 6; wherein the steps of eluting and fixing are repetitively performed, and the first time the eluting step is performed the wet gel is immersed in the solvent for a longer time period than in subsequent times the eluting step is performed.

8. A method of manufacturing a gradient index optical element according to claim 6; wherein the step of eluting comprises immersing the wet gel in the solvent for a time at least long enough for the solvent to reach a center portion of the wet gel.

9. A method of manufacturing a gradient index optical element according to claim 6; wherein the steps of eluting and fixing are repetitively performed, and the first time the eluting step is performed the wet gel is immersed in the solvent for a time at least long enough for the solvent to reach a center portion of the wet gel, and each subsequent time the eluting step is performed the wet gel is immersed in the solvent for a time not long enough for the solvent to reach the center portion of the wet gel.

10. A method of manufacturing a gradient index optical element according to claim 6; further comprising the steps of drying the wet gel; and sintering the dried wet gel.

* * * * *